(12) United States Patent
Koturbach

(10) Patent No.: US 11,913,402 B2
(45) Date of Patent: Feb. 27, 2024

(54) DIESEL-STEAM POWER PLANT

(71) Applicant: Ivan Ivanovych Koturbach, Mukachevo (UA)

(72) Inventor: Ivan Ivanovych Koturbach, Mukachevo (UA)

( * ) Notice: Subject to any disclaimer, the term of this patent is extended or adjusted under 35 U.S.C. 154(b) by 0 days.

(21) Appl. No.: 17/770,607

(22) PCT Filed: Nov. 24, 2020

(86) PCT No.: PCT/UA2020/000101
§ 371 (c)(1),
(2) Date: Apr. 20, 2022

(87) PCT Pub. No.: WO2021/080549
PCT Pub. Date: Apr. 29, 2021

(65) Prior Publication Data
US 2023/0332560 A1    Oct. 19, 2023

(30) Foreign Application Priority Data
Oct. 21, 2020  (UA) .............. u 2019 10467

(51) Int. Cl.
*F02G 5/04*    (2006.01)
*F01N 5/04*    (2006.01)
*F01N 3/038*   (2006.01)

(52) U.S. Cl.
CPC .............. *F02G 5/04* (2013.01); *F01N 3/038* (2013.01); *F01N 5/04* (2013.01); *F01N 2240/22* (2013.01); *F01N 2290/04* (2013.01); *F01N 2610/102* (2013.01); *F01N 2610/1426* (2013.01); *F01N 2610/1433* (2013.01); *F01N 2610/1453* (2013.01)

(58) Field of Classification Search
CPC ........ F01N 3/038; F01N 5/04; F01N 2240/22; F01N 2290/04; F01N 2610/102; F01N 2610/1426; F01N 2610/1433; F01N 2610/1453; F02G 5/04
USPC ......... 60/280, 281, 309, 310, 311, 318, 320, 60/324, 618
See application file for complete search history.

(56) References Cited

U.S. PATENT DOCUMENTS

| 2011/0005477 A1* | 1/2011 | Terashima | ............ F01K 23/065 165/104.19 |
| 2018/0187575 A1* | 7/2018 | Shu | .......................... F02G 5/04 |

FOREIGN PATENT DOCUMENTS

| CN | 107989722 A | * | 5/2018 |
| RU | 2725583 C1 | * | 7/2020 |

* cited by examiner

*Primary Examiner* — Jorge L Leon, Jr.
(74) *Attorney, Agent, or Firm* — Inventa Capital Group

(57) ABSTRACT

The diesel-steam power plant is equipped with a water-to-water type heat exchanger and the oil cooling system is equipped with an oil-to-water type heat exchanger, additionally introduced into the design of the proposed invention of the water supply system, a steam generator with a steam turbine and a steam condenser and cooling circulation systems are additionally introduced to the diesel-steam power plant liquids.

1 Claim, 1 Drawing Sheet

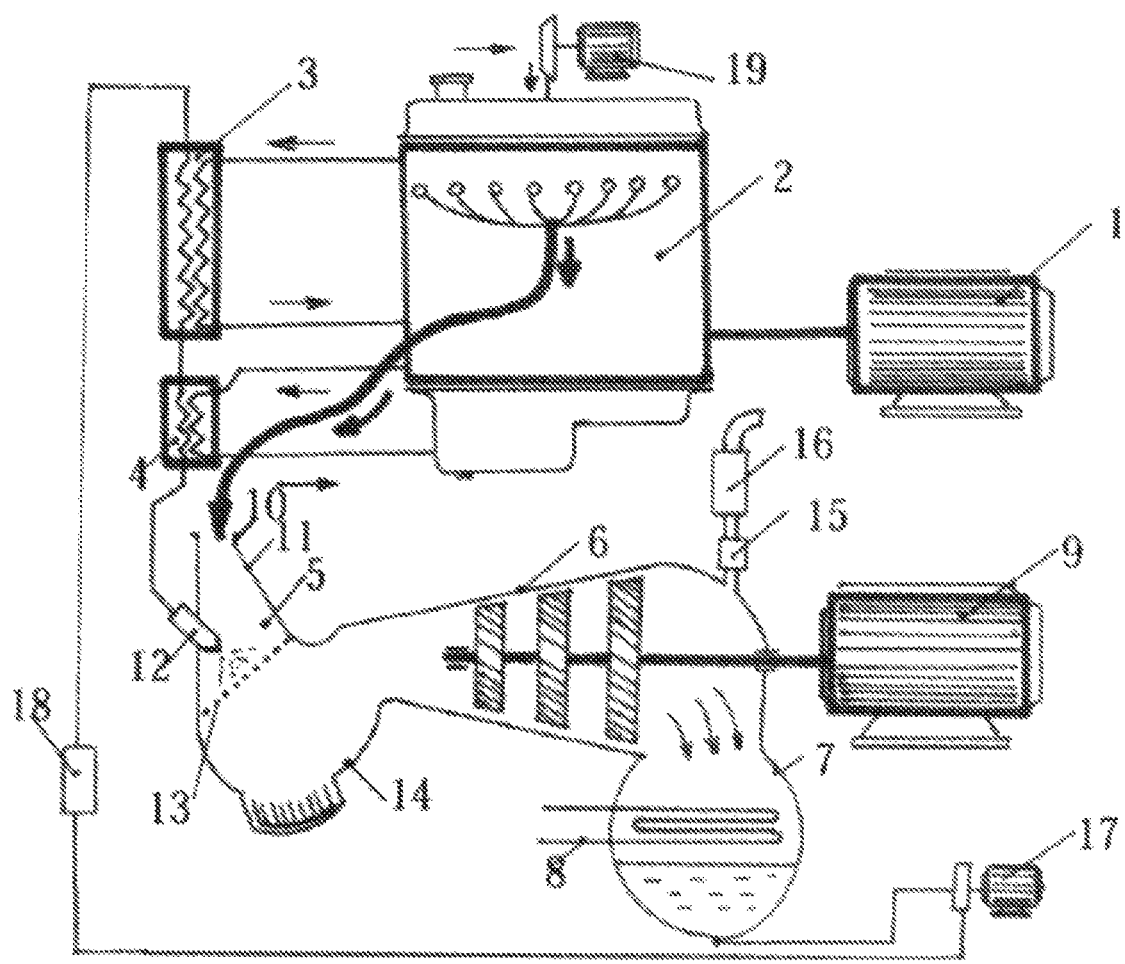

DIESEL-STEAM POWER PLANT

FIELD OF THE INVENTION

The invention relates to the field of engine building, mainly to power plants of diesel or gas-piston power generating plants and can be used to generate electricity from waste heat loss and pressure, as well as to capture harmful components of exhaust gases.

BRIEF DESCRIPTION OF THE INVENTION

Known diesel generator set (DGS) (Source 1), (Source 2) consists of a power generator associated with a diesel engine. The well-known diesel engine is equipped with a working fluid cooling system with a radiator, an oil cooling system with a radiator, an exhaust system with a turbocharger and is equipped with a muffler.

The disadvantage of the known diesel generator set is that all the heat and pressure in the exhaust gases is disposed of into the atmosphere which reduces the efficiency of the unit by more than half and harmful components from the exhaust gases are released into the atmosphere, negatively affecting the environment.

SUMMARY OF THE INVENTION

The invention is based on the task of improving the known diesel generator set in which the diesel engine cooling system is equipped with a water-to-water type heat exchanger and the oil cooling system is equipped with an oil-to-water type heat exchanger and additionally introduced into the design of the proposed invention of the water supply system, diesel engine power system additionally introduced a steam generator with a steam turbine and a steam condenser and a cooling liquid circulation system.

The technical result that is achieved through the work of the present invention is to increase the amount of electricity produced with the same amount of fuel consumed; reducing the cost of electricity; increase in the efficiency factor (COP) of the power plant; reducing the amount of emissions of harmful components into the atmosphere.

In addition, due to the operation of the invention, it becomes possible to use the released heat for domestic and technological needs in the absence of the need for water treatment. This goal is achieved due to the fact that the produced heat during the operation of the diesel engine is used to heat water which is then injected under pressure into the high-temperature exhaust gases of the diesel engine where it actively evaporates and goes to the steam turbine to generate electricity. Also, an important component of this system is that steam formation takes place with direct contact of water and hot exhaust gases, as a result of which there is no need for water treatment which significantly increases the efficiency and environmental performance of the power plant.

DETAILED DESCRIPTION OF THE INVENTION

The drawing (FIG. 1) shows a diagram of a diesel-steam power plant which includes an electric generator (1) and a diesel engine associated with it. The diesel engine cooling system is equipped with a heat exchanger of the water-to-water type (3) and the oil cooling system is equipped with a heat exchanger of the oil-to-water type (4). The diesel-steam power plant includes a steam generator (5), with steam turbine (6) and steam condenser (7) with cooling liquid circulation system (8). The steam turbine (6) is connected to an electric generator (9). The steam generator (5) consists of a receiving inlet manifold (10) of the nozzle part (11), a nozzle (12), a divider (13), a swirl chamber (14) with soot and slag traps. The steam turbine (6) is equipped with an overpressure relief valve (15) with a silencer (16).

The water supply system is equipped with a pump (17) and a filter (18). The diesel engine power system is equipped with an electric turbo compressor (19). The diesel-steam power plant operates as follows: during the operation of the diesel engine from the exhaust gas system, gases under pressure of 9-12 kg/cm and a temperature of 600-700° C. enter the inlet manifold (10) of the nozzle part (11) to the splitter (13), which is actively heated. At the same time, water heated to 95-100° C. is supplied under pressure through the nozzle (12). The water is heated in series in the heat exchangers (3) and (4), and the water is pressurized via the pump (17).

Heated or superheated water is injected into the flow of high-temperature exhaust gases and, in contact with a hot splitter (13) and gases, actively turns into steam and increasing pressure and speed in the nozzle part (11), changes the direction of movement by 90° in the vortex chamber (14) and precipitates formed slag and soot, due to mass differences and centrifugal force. Next, the steam enters the blades of the steam turbine (6) where it is converted into mechanical energy, namely into a rotating motion which is transmitted to the electric generator (9). Next, the exhaust steam enters the condenser (7) where it condenses into water. For active steam condensation in the working area, the condenser (7) is equipped with a cooling liquid circulation system (8) in which liquid is supplied from the heating systems of domestic and technological consumers, sea water (in case of use on ships) or other cooled liquid. To stabilize the pressure, the steam turbine is equipped with an overpressure valve (15) and a silencer (16). To clean the condensed liquid in the water supply system, it is equipped with a filter (18). An electrically driven turbo compressor (19) is equipped to create excess pressure in the diesel engine power supply system.

What is claimed is:

1. A diesel-steam power plant comprising:
a first electric generator operatively coupled to a diesel engine, the diesel engine including;
an electric turbo compressor configured to compress an intake air of the diesel engine;
a diesel engine cooling system including a first heat exchanger configured to cool a cooling water of the diesel engine, and a second heat exchanger configured to cool an engine oil of the diesel engine; and
an exhaust gas system configured to convey exhaust gases of the diesel engine;
a second electric generator operatively coupled to a steam generator, the steam generator including:
an inlet manifold coupled to a downstream end of the exhaust gas system;
a nozzle coupled to a nozzle part of the inlet manifold, the nozzle configured to inject water into
a flow of the exhaust gases towards a divider so as to produce au exhaust steam mixture;
a swirl chamber partially defined by the divider, the swirl chamber configured to trap soot and slag entrained in the exhaust steam mixture.

* * * * *